(12) United States Patent
Bourcier et al.

(10) Patent No.: US 10,538,990 B2
(45) Date of Patent: Jan. 21, 2020

(54) USING COLLOIDAL SILICA AS A ZONAL ISOLATION MATERIAL AND FAST PATH BLOCKER IN GEOLOGICAL FORMATIONS

(71) Applicant: LAWRENCE LIVERMORE NATIONAL SECURITY, LLC, Livermore, CA (US)

(72) Inventors: William L. Bourcier, Livermore, CA (US); Sarah K. Roberts, Livermore, CA (US); Jeffery J. Roberts, Livermore, CA (US); Souheil M. Ezzedine, Berkeley, CA (US); Jonathan D. Hunt, Dublin, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 15/875,183

(22) Filed: Jan. 19, 2018

(65) Prior Publication Data

US 2018/0208826 A1 Jul. 26, 2018

Related U.S. Application Data

(62) Division of application No. 13/722,843, filed on Dec. 20, 2012, now Pat. No. 9,909,052.

(51) Int. Cl.
*E21B 33/13* (2006.01)
*F24T 10/20* (2018.01)
*C09K 8/504* (2006.01)
*E21B 41/00* (2006.01)

(52) U.S. Cl.
CPC ............ *E21B 33/13* (2013.01); *C09K 8/5045* (2013.01); *F24T 10/20* (2018.05); *E21B 41/0064* (2013.01); *Y02C 10/14* (2013.01); *Y02E 10/20* (2013.01)

(58) Field of Classification Search
None
See application file for complete search history.

(56) References Cited

U.S. PATENT DOCUMENTS

| 4,732,213 A | 3/1988 | Bennett et al. |
| 5,789,352 A | 8/1998 | Carpenter et al. |
| 7,726,402 B2 | 6/2010 | Ramakrishnan et al. |
| 7,846,250 B2 | 12/2010 | Barlet-Gouedard et al. |
| 7,892,352 B2 | 2/2011 | Roddy et al. |
| 2008/0319726 A1 | 12/2008 | Berge et al. |

(Continued)

FOREIGN PATENT DOCUMENTS

WO   WO2009079047 A2   6/2009

OTHER PUBLICATIONS

Mitchell et al., "Biofilm Enhanced Geogologic Sequestration of Supercritical C02," Intl J. of Greenhouse Gas Control., vol. 3, Issue 1, http://www.sciencedirect.com/science/article/pii/S1750583608000406, Jan. 2009, pp. 90-99.

*Primary Examiner* — Andrew Sue-Ako
(74) *Attorney, Agent, or Firm* — Eddie E. Scott

(57) ABSTRACT

A system for blocking fast flow paths in geological formations includes preparing a solution of colloidal silica having a nonviscous phase and a solid gel phase. The solution of colloidal silica is injected into the geological formations while the solution of colloidal silica is in the nonviscous phase. The solution of colloidal silica is directed into the fast flow paths and reaches the solid gel phase in the fast flow paths thereby blocking flow of fluid in the fast paths.

6 Claims, 12 Drawing Sheets

(56) References Cited

U.S. PATENT DOCUMENTS

| | | |
|---|---|---|
| 2009/0081105 A1 | 3/2009 | Boucier |
| 2009/0126930 A1 | 5/2009 | Barlet-Gouedard et al. |
| 2010/0044039 A1* | 2/2010 | Rose ............... C09K 8/506 166/270 |
| 2010/0314105 A1* | 12/2010 | Rose ............... E21B 43/26 166/250.1 |
| 2011/0030957 A1 | 2/2011 | Constantz et al. |
| 2011/0066380 A1 | 3/2011 | Hager et al. |
| 2011/0215234 A1* | 9/2011 | Rose ............... E21B 47/1015 250/259 |
| 2013/0292120 A1 | 11/2013 | Patil et al. |

* cited by examiner

USING COLLOIDAL SILICA AS A ZONAL ISOLATION MATERIAL AND FAST PATH BLOCKER IN GEOLOGICAL FORMATIONS

CROSS-REFERENCE TO RELATED APPLICATIONS

The present application is a Division of application Ser. No. 13/722,843 filed Dec. 20, 2012, the disclosure of which is hereby incorporated by reference in its entirety for all purposes.

STATEMENT AS TO RIGHTS TO INVENTIONS MADE UNDER FEDERALLY SPONSORED RESEARCH AND DEVELOPMENT

The United States Government has rights in this invention pursuant to Contract No. DE-AC52-07NA27344 between the United States Department of Energy and Lawrence Livermore National Security, LLC for the operation of Lawrence Livermore National Laboratory.

BACKGROUND

Field of Endeavor

The present invention relates to geological formations and more particularly to using colloidal silica to block fast flow paths and as a zonal isolation material in geological formations.

State of Technology

U.S. Pat. No. 4,732,213 for colloidal silica-based fluid diversion provides the state of technology information reproduced below. U.S. Pat. No. 4,732,213 is incorporated into this application in its entirety for all purposes by this reference.

A process for selectively plugging permeable zones in subterranean formations or for plugging subterranean leaks which comprises injecting into the permeable zone or the site of the subterranean leak an aqueous solution containing 1 to 70 weight percent of a non-aggregated colloidal silica sol having a particle size in the range between 4 and 100 nm and a pH in the range between about 1 and 10, and causing said solution to gel in said zone or at said site.

Recovery of oil from subterranean formations frequently involves displacing crude oil with a driving fluid, e.g., gas, water, brine, steam, polymer solution, foam, or micellar solution. Ideally, such techniques (commonly called flooding techniques) would provide a bank of oil of substantial depth being driven to a producing well; in practice, that frequently is not the case. Oil-bearing strata are usually heterogeneous, some parts of them being more permeable to a driving fluid than others. As a consequence, channeling frequently occurs so that the driving fluid flows preferentially through zones depleted of oil (so-called "thief" zones) rather than through those parts of the strata which contain sufficient oil to make oil-recovery operations profitable. High permeability zones can also cause undesirable loss of drilling fluids when a well (e.g., water, oil or waste disposal) is being drilled. Misplaced casing perforations or casing leaks are another cause of channeling of the driving fluid through zones of high permeability in the subterranean formations. In addition, casing leaks sometimes occur in the annular region above the injection or production packer, and need to be dealt with whether the leaks occur in high or low permeability zones.

A variety of fluid diversion techniques have been proposed in the prior art. Typically, a gel is formed in situ in zones of very high permeability, thus plugging them and causing fluid to flow through zones which originally were of lower permeability than those which have been plugged. However, such techniques are in general not suitable at temperatures in excess of about 100° C. and are limited to short gel times, e.g., less than 12 hours, thereby severely limiting their effectiveness. Thus, the prior art fluid diversion gels cannot be used in high temperature reservoirs commonly encountered in deep wells or in steam-flood operations, and in many cases the treatment composition can be pumped only a short distance from the wellbore before it gels regardless of reservoir temperature.

U.S. Published Patent Application No. 2009/0260544 for well treatment compositions and methods utilizing nano-particles provides the state of technology information reproduced below. U.S. Published Patent Application No. 2009/0260544 is incorporated into this into this application in its entirety for all purposes by this reference.

An exemplary embodiment of the present invention provides a method of cementing. The method comprises introducing a cement composition into a subterranean formation, wherein the cement composition comprises cement, water and at least one nano-particle selected from the group consisting of particulate nano-silica, nano-alumina, nano-zinc oxide, nano-boron, nano-iron oxide and combinations thereof.

Another exemplary embodiment of the present invention provides a method of cementing in a subterranean formation. The method comprises including encapsulated nano-particles in a cement composition. The method further comprises introducing the cement composition into the subterranean formation.

Another exemplary embodiment of the present invention provides a method of accelerating set time of a cement composition. The method comprises including particulate nano-silica in a cement composition. The method further comprises introducing the cement composition into a subterranean formation. The method further comprises allowing the cement composition to set in the subterranean formation.

Another exemplary embodiment of the present invention provides a well cement composition. The well cement composition comprises cement water and at least one nano-particle selected from the group consisting of particulate nano-silica, nano-alumina, nano-zinc oxide, nano-boron, nano-iron oxide and combinations thereof.

Another exemplary embodiment of the present invention provides a method of treating a subterranean formation. The method includes introducing a treatment fluid into a subterranean formation, wherein the treatment fluid comprises at least one nano-particle selected from the group consisting of particulate nano-silica, nano-alumina, nano-zinc oxide, nano-boron, nano-iron oxide, and combinations thereof.

Another exemplary embodiment of the present invention provides a method of using nano-particles in a well treatment fluid. The method comprises including encapsulated nano-particles in the well treatment fluid.

Another exemplary embodiment of the present invention provides a well treatment fluid. An embodiment of the well treatment fluid comprises at least one nano-particle selected from the group consisting of particulate nano-silica, nano-alumina, nano-zinc oxide, nano-boron, nano-iron oxide, and combinations thereof. Another embodiment of the well treatment fluid comprises encapsulated nano-particles.

U.S. Published Patent Application No. 2009/0081105 for silica extraction from geothermal water provides the state of technology information reproduced below. U.S. Published Patent Application No. 2009/0081105 is incorporated into this application in its entirety for all purposes by this reference.

Geothermal fluids are produced from subsurface reservoirs at depths commonly between 500 and 3000 meters. Their heat is extracted and used to generate power. The fluids are then reinjected into the subsurface to replenish the fluid reservoir. Resource removal optimally takes place after or near the end of the energy extraction process, but prior to reinjection. The temperatures of reinjected fluids are commonly between 50 and 150° C. and pressures at or slightly above steam saturation. In some cases, mineral extraction may allow further energy extraction that, without treatment, would be uneconomic due to scale formation. For example, the geothermal plants at Wairakei, New Zealand terminate energy extraction as the fluids cool to below 130° C. because silica scaling becomes too difficult to control (Brown, 2000, Proc. World Geothermal Congress p. 533). Silica extraction will allow additional energy extraction to lower temperatures. Mineral recovery also improves the economics of geothermal energy production by helping to minimize scaling both in the plant and in reinjection wells.

Many constituents of geothermal fluids have value provided they can be separated and purified. Previous published work on extraction of resources from geothermal fluids has focused on a wide variety of materials including precious and platinum group metals, zinc, lead, copper, manganese, rare earths, silica, lithium, arsenic, antimony, boron, bromine, iodine, strontium and barium sulfate, precipitated calcium carbonate, calcium chloride, potash, table salt, and sodium sulfate. Most of this work has focused on extraction of silica, lithium, and zinc. Typical recovery methods include acid leaching, biochemical leaching, evaporation and precipitation as sulfides.

Silica is an ubiquitous component of geothermal fluids and must be removed or reduced in concentration to allow other components to be removed. Most hydrothermal systems equilibrate with quartz ($SiO_2$) causing the fluids to have silica concentrations that reflect the temperature of the reservoir—the hotter the reservoir, the higher the silica concentration of the fluid.

During energy production, the geothermal fluid cools and some water is extracted as steam. Both processes cause the silica to become increasingly supersaturated. Eventually the silica tends to precipitate and form scale on various plant components or in reinjection wells. Silica will also tend to precipitate on mineral extraction processing equipment if not removed prior to mineral co-production. Thus a key need for mineral co-production is the elimination of silica scaling.

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides a system for blocking fast flow paths in geological formations or in other ways causing beneficial alteration of their permeability and flow properties. The system includes preparing a solution of colloidal silica having a nonviscous phase and a solid gel phase. The solution of colloidal silica is injected into the geological formations while the solution of colloidal silica is in the nonviscous phase. The solution of colloidal silica is directed into the fast flow paths and transforms into the solid gel phase in the fast flow paths thereby blocking flow of fluid in the fast paths. Current methods of attempting to block fast flow paths include the use of common Portland cements, polymers, and carbonate minerals to cement or block the fast flow paths.

The present invention has use in enhancing geothermal systems. The present invention has use in enhanced geothermal systems where hydrofracing has introduced unwanted fast paths. The present invention also has use in blocking fast paths in operations to recover oil and natural gas. The present invention has use in blocking fast paths in operations to recover oil and natural gas after hydrofracing. The present invention has use in blocking fast paths in operations to recover oil and natural gas after hydrofracing in enhanced oil recovery. The present invention has use in blocking fast paths in operations to recover oil and natural gas after hydrofracing in tight shale gas formations. The present invention has use in blocking of fast paths in site remediation operations such as those to block leakage of contaminants from underground tanks or from leaking surface waste installations, such as radioactive waste storage facilities. The present invention has use in carbon dioxide sequestering by blocking flow paths in cap rock or other geological formations. The present invention has use in prevention of leakage of drilling and production fluids around subsurface well bores. The present invention has use in modification of geothermal reservoir properties such that they are able to produce greater amounts of energy. The present invention has use in lowering the amount of water loss from a geothermal field by emplacement in the perimeter of the geothermal field such that it acts as an impermeable barrier surrounding the active reservoir.

Blocking Fast Paths in Geothermal Formations

In one embodiment, the present invention provides a system wherein colloidal silica harvested from geothermal fluids is used to preferentially block fast paths in the subsurface allowing greater energy production from geothermal power plants. The silica is harvested using existing silica extraction technologies and concentrated in solution such that it will transform, after some incubation time, into a solid gel. In one embodiment of the present invention, the solution is reinjected into the subsurface while non-viscous and flows to the permeable (fast-path) zone, but then transforms to a gel in that zone and acts to block further fluid transport in that zone. The length of the incubation period is adjusted by adjusting the silica content, colloid size, salinity, and pH, or predetermined combinations of silica content, colloid size, salinity, and pH, to achieve the desired transport time and positioning of the solid gel. The results of reservoir modeling and tracer test results are used to guide the emplacement process in order to locate the silica gel in the desired location.

Blocking Fast Paths in Oil and Gas Formations

In one embodiment a solution of colloidal silica is prepared having a nonviscous phase with a predetermined incubation period before forming a solid gel. The predetermined incubation period is established by adjusting the silica content, colloid size, salinity, and pH, or predetermined combinations of silica content, colloid size, salinity, and pH. In one embodiment the system includes reservoir modeling in the step of allowing the solution of colloidal silica to flow into the fast paths and reach the solid gel phase thereby blocking the flow of the production fluid in the fast paths and diverting the flow of the production fluid into the other paths.

Blocking Fast Paths in Environmentally Contaminated Formations

The present invention has use in blocking of fast paths in site remediation operations such as those to block leakage of contaminants from underground tanks, isolate subsurface contaminant sources, or from leaking surface waste installations, such as radioactive waste storage facilities.

Blocking Fast Paths in Carbon Dioxide Sequestering Formations

The present invention has use in carbon dioxide sequestering by blocking flow paths in cap rock or other geological formations.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF SPECIFIC EMBODIMENTS

Figure 1:
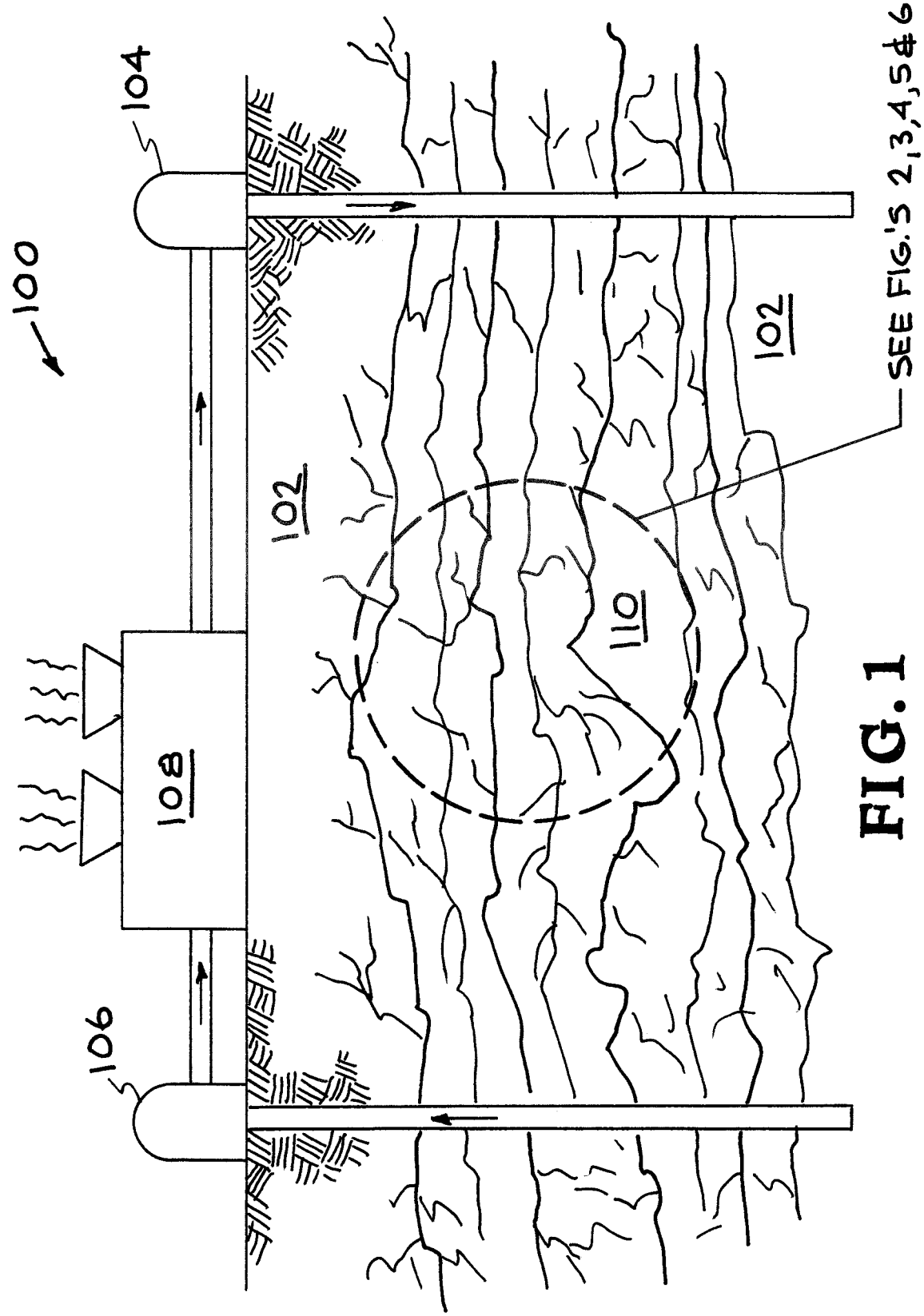
FIG. 1 is an illustration of a geothermal system incorporating the present invention.

Referring to the drawings, to the following detailed description, and to incorporated materials, detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

Referring now to the drawings and in particular to FIG. 1, a geothermal system incorporating the present invention is illustrated. The geothermal system is designated generally by the reference numeral 100. The geothermal system 100 includes a first well 104 designated as an injection well and a second well 106 designated as extraction or production well. The first well 104 (injection well) and the second well 106 (extraction well) are shown extending into a geothermal formation 102. Fluid is injected into the first well 104 (injection well) and the fluid is extracted at the second well 106 (extraction well). The fluid from the second well flows into the power generation/cooling system 108.

A section of the fractured geothermal formation within the dotted circle in FIG. 1 is designated by the reference numeral 110. This section of the fractured geothermal formation 110 within the dotted circle is made up of fractured rock 110. The fluid from the injection well 104 is circulated through the fractured rock 110 where it is heated by the geothermal formation 110. This circulation pattern illustrates basic features of the production of energy from the geothermal formation 102. Hot dry rock resources occur at depths of 3 to 5 miles everywhere beneath the Earth's surface and at lesser depths in certain areas. Access to these resources involves injecting water down the first well 104, circulating the water through the hot fractured rock 110, and drawing off the heated water from the second well 106. A major drawback for current attempts to engineer geothermal systems is the existence of 'fast paths'—high permeability zones that short-circuit flow and allow rapid movement of fluid from the first well 104, the injection well, to the second well 206, the production well. The fluid is not able to acquire much heat during its reduced contact time, and the field produces less energy.

Figure 2:
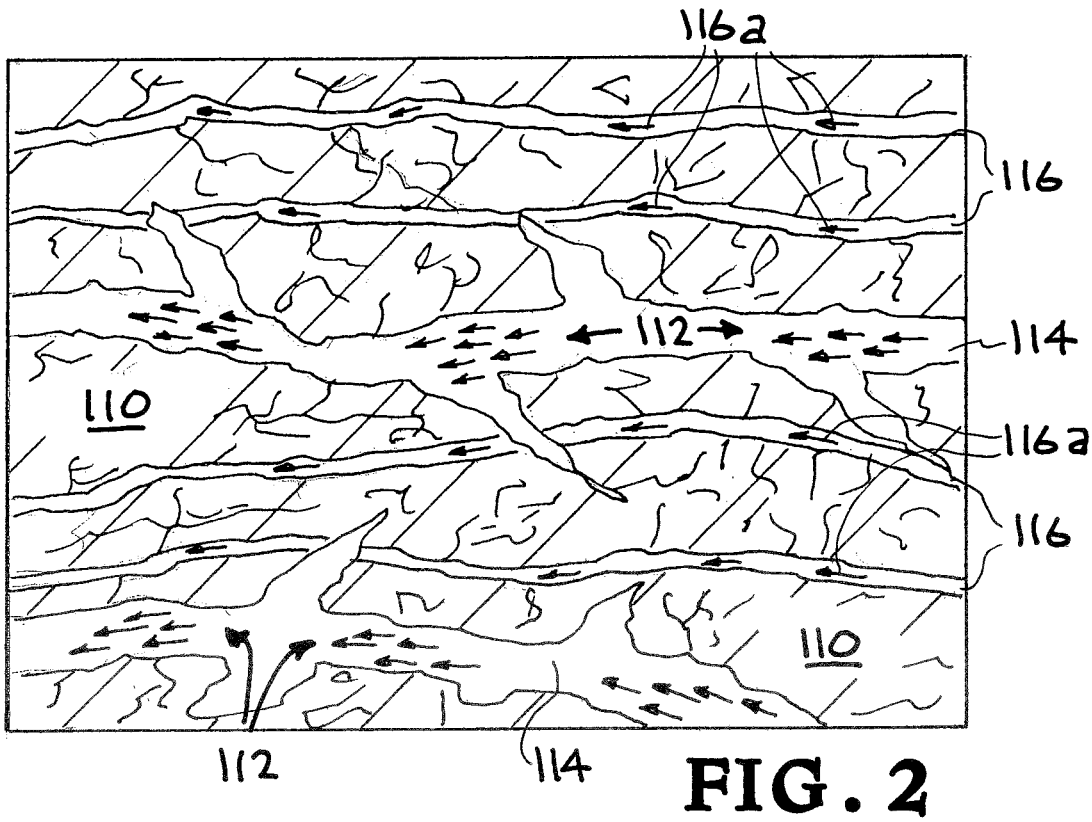
FIG. 2 show a section of the FIG. 1 fractured geothermal formation in greater detail.

Referring now to FIG. 2, the section 110 of the fractured geothermal formation within the dotted circle is shown in greater detail. Hot dry rock resources in the form of heated formations occur at depths of 3 to 5 miles everywhere beneath the Earth's surface and at lesser depths in certain areas. Access to these resources involves injecting water down the first well 104, circulating the water through the hot fractured rock 110, and drawing off the heated water from the second well 106. A major drawback for current attempts to engineer geothermal systems is the existence of "fast paths" that are high permeability zones that short-circuit flow and allow rapid movement of fluid from the first well 104, the injection well, to the second well 106, the production well. The fluid is not able to acquire much heat during its reduced contact time, and the field produces less energy.

As shown in FIG. 2, the section 110 of the fractured geothermal formation includes the "fast paths" permeability zones designate by the reference numeral 114 which allow rapid movement of the fluid as illustrated by the arrows 112. The fractured geothermal formation also includes the smaller permeability zones designate by the reference numeral 116 which provide a much slower movement of the fluid as illustrated by the arrows 116a. The "fast paths" 114 allow rapid movement of fluid through the section 110 of the fractured geothermal formation and short-circuit flow preventing or reducing flow through the smaller permeability zones 116. The fluid is not able to acquire much heat during its reduced contact time, and the field produces less energy.

The present invention provides a system that uses colloidal silica as a cementing agent to preferentially reduce permeability in "fast path zones" in a geothermal formation. Colloidal silica solutions are "tuned" in terms of silica concentration and solution composition so that the silica solution transforms to a gel with the desired timing. Whereas freshly-made colloidal silica solutions have viscosities only slightly greater than water, over time the silica sols link forming a 3-D network which gives rise to a large increase in viscosity. This transition to gel follows an incubation period during which there is little change in viscosity. The gel is a material with properties similar to those of a very dense and viscous gelatin. Over long times, the gel will re-structure and dehydrate to form microcrystalline silica, mineralogically identical to natural vein-filling agate. Any environmental effects of emplacement of this material is minimal.

The present invention will be further explained, illustrated, and described in the following examples of systems of the present invention. The examples demonstrate the utility and/or function of the invention and helps provide a full describe of the invention.

Example 1

Figure 3:
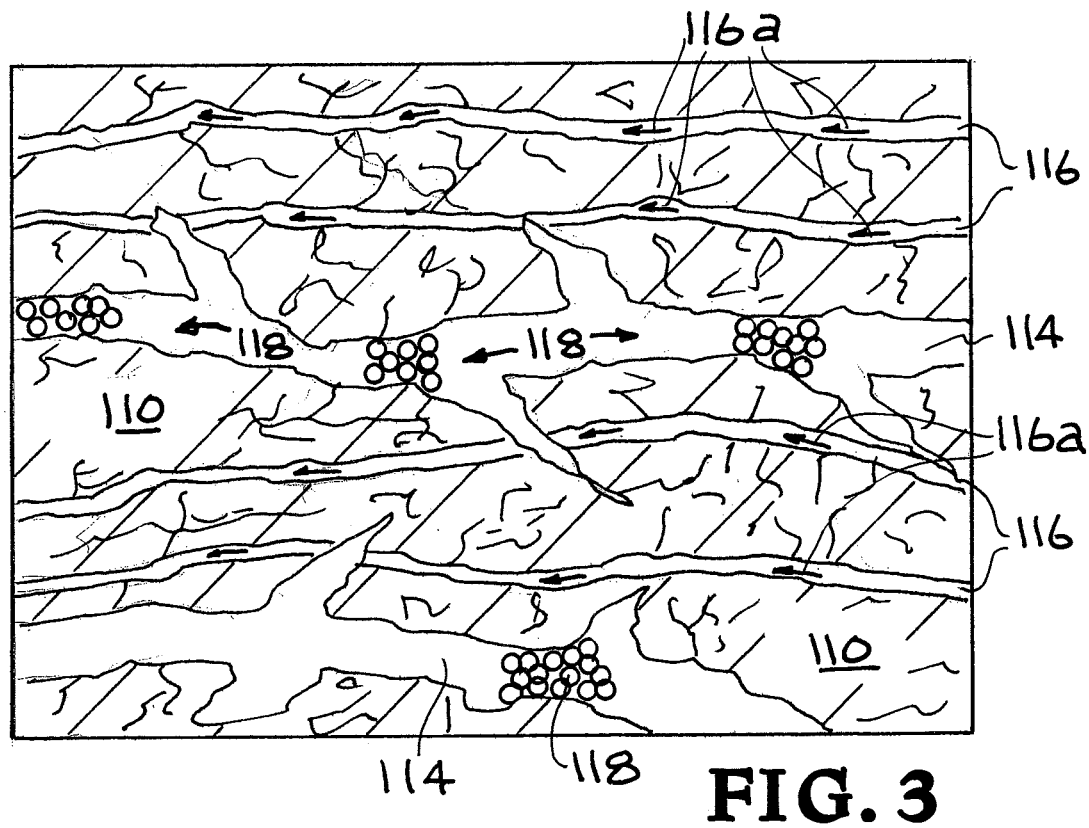
FIG. 3 illustrates one example of a system of the present invention.

Referring now to FIG. 3, one example of a system of the present invention is illustrated and described. The section 110 of the fractured geothermal formation within the dotted circle is illustrated in detail. The section 110 of the fractured geothermal formation includes the "fast paths" 114 permeability zones, which without the present invention, would allow rapid movement of the fluid through the geothermal formation and the fluid would not be able to acquire much heat during its reduced contact time, and the field would produce less energy.

The present invention uses colloidal silica as a cementing agent to preferentially reduce permeability in the fast path zones 114 in the geothermal formation 110. As illustrated in FIG. 3, colloidal silica 118 is introduced into the fast path zones 114. A desired gelation time is selected with reservoir modeling and tracer test results to predict transport times. By combining the two, the process is tuned such that gelation of the injected colloidal silica 118 happens in the fast path zones 114, effectively blocking these zones 114 and forcing fluid flow through zones 116 that provide higher heat transfer. The rate at which colloidal silica solutions transform to gel is affected by the size and concentration of silica colloids, the pH, the salt content of the coexisting fluid, and the temperature. By adjusting one or more of these parameters, the colloidal silica solutions that transform to gels are provided on time scales varying from a few seconds to many days. The present invention provides a desired gelation time, with reservoir modeling to predict transport times. By combining the two, the process is tuned.

Figure 4:
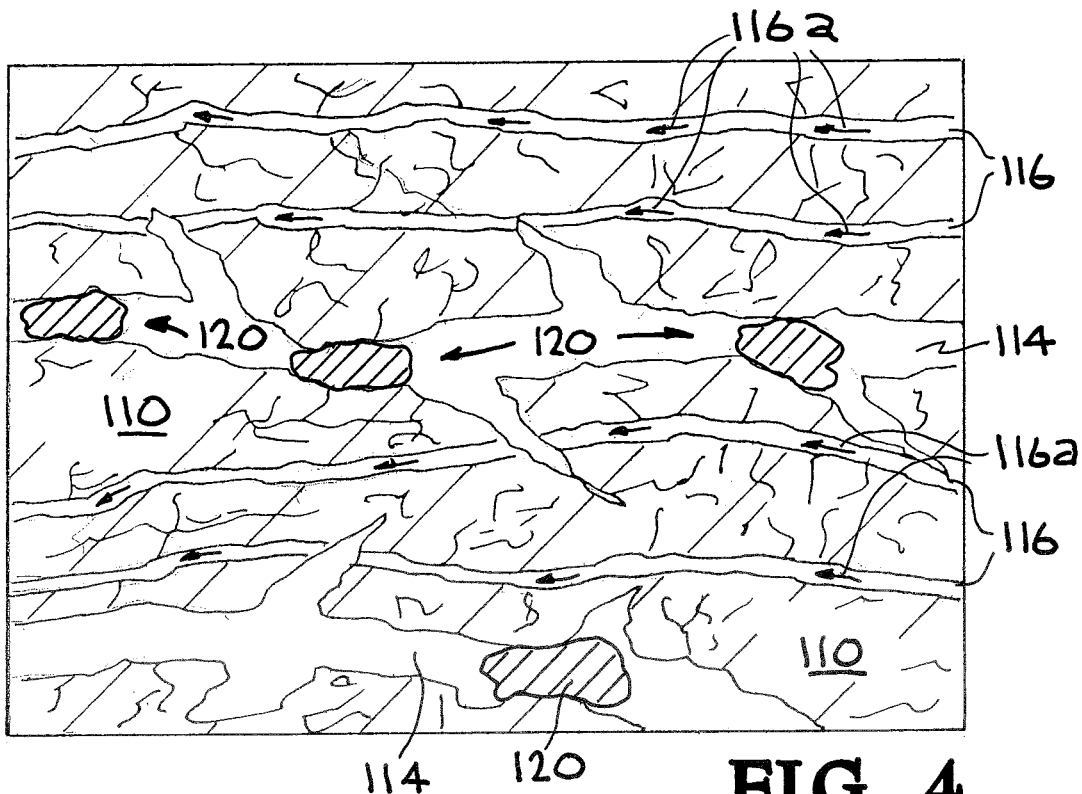
FIG. 4 illustrates cryptocrystalline silica (agate) formed in the fractured geothermal formation.

Referring now to FIG. 4, the colloidal silica has initially been used as a cementing agent to block the fast path zones 114 in the geothermal formation 110. Over longer time periods, the colloidal silica 118 will age and dehydrate to form cryptocrystalline silica (agate) 120, which will remain as a permanent feature of the geothermal reservoir. The colloidal silica was previously introduced into the fast path zones 114. This was accomplished using a desired gelation time that was selected with reservoir modeling to predict transport times. By combining the two, the process was tuned such that gelation of the injected colloidal silica happened in the fast path zones 114, effectively blocking these zones 114 and forcing fluid flow through zones 116 that provide higher heat transfer. The colloidal silica has aged and dehydrated to form cryptocrystalline silica (agate) 120. The cryptocrystalline silica (agate) 120 remains as a permanent feature of the geothermal formation 110.

Example 2

Figure 5:
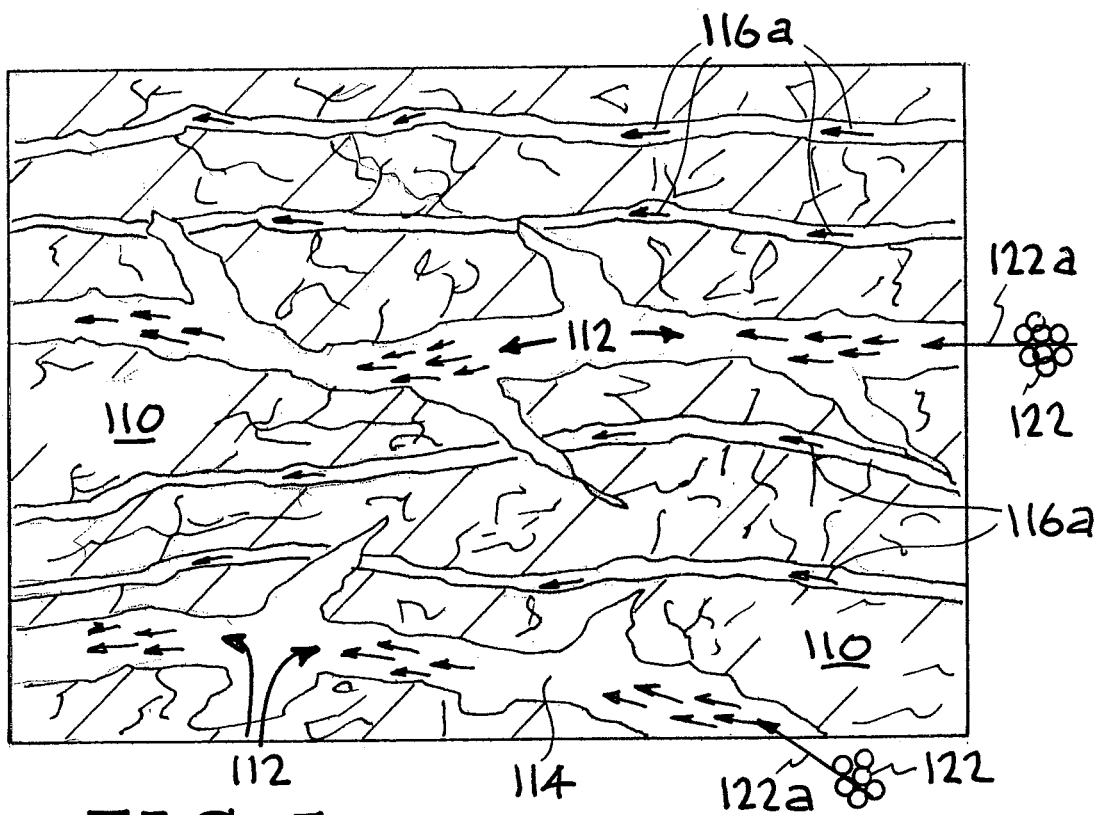
FIG. 5 illustrates another example of a system of the present invention.
Figure 6:
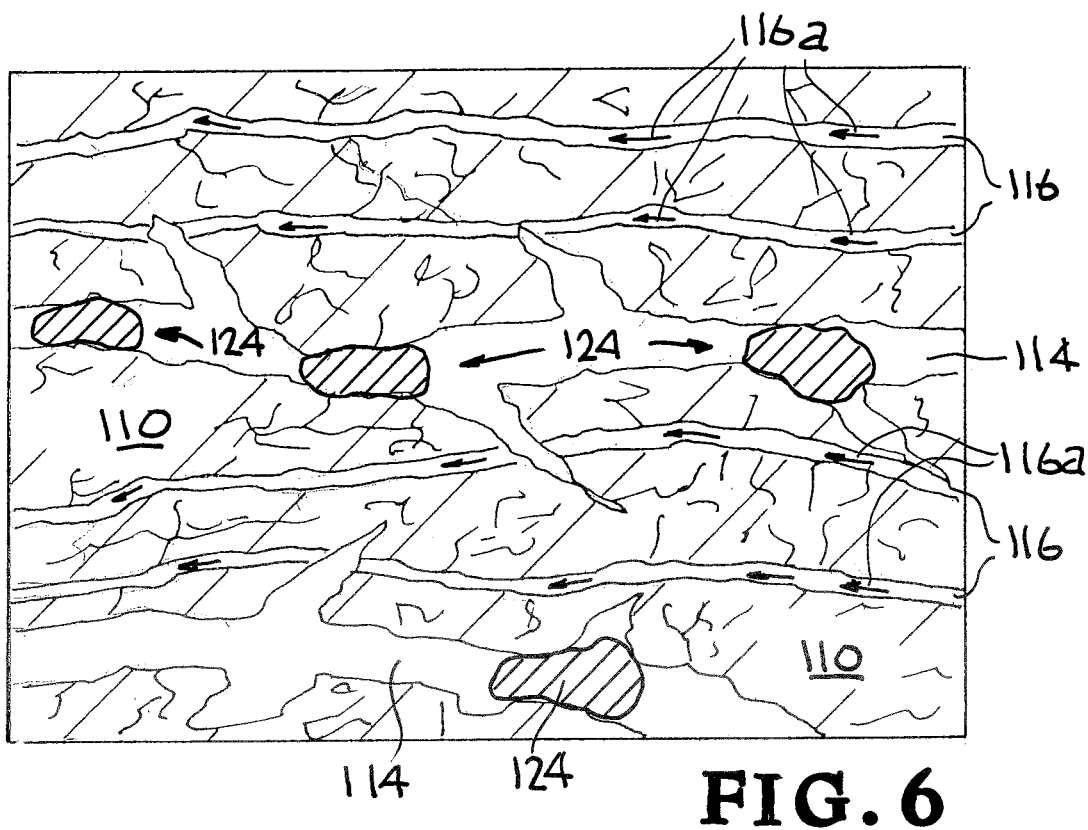
FIG. 6 illustrates cryptocrystalline silica (agate) formed in the fractured geothermal formation.

Referring now to FIGS. 5 and 6, another example of a system of the present invention is illustrated and described. The section 110 of the fractured geothermal formation within the dotted circle shown in FIG. 1 is shown in greater detail in FIGS. 5 and 6. The section 110 of the fractured geothermal formation includes the "fast paths" permeability zones designate by the reference numeral 114 which allow rapid movement of the fluid as illustrated by the arrows 112. The fractured geothermal formation also includes the smaller permeability zones designate by the reference numeral 116 which provide a much slower movement of the fluid as illustrated by the arrows 116a. The "fast paths" 114 allow rapid movement of fluid through the section 110 of the fractured geothermal formation and short-circuit flow preventing or reducing flow through the smaller permeability zones 116. The fluid in the fast paths 114 is not able to acquire much heat during its reduced contact time, and the field produces less energy. FIG. 6 shows cryptocrystalline silica (agate) 124 formed in section 110 of the fractured geothermal formation.

The present invention uses colloidal silica 122 as a cementing agent to preferentially reduce permeability in the fast path zones 114 in the geothermal formation 110. Colloidal silica 118 is introduced into the fast path zones 114. A desired gelation time is selected with reservoir modeling to predict transport times. By combining the two the process is tuned such that gelation of the injected colloidal silica 118 happens in the fast path zones 114, effectively blocking these zones 114 and forcing fluid flow through zones 116 that provide higher heat transfer. The rate at which colloidal silica solutions transform to gel is affected by the size and concentration of silica colloids, the pH, the salt content of the coexisting fluid, and the temperature. By adjusting one or more of these parameters, the colloidal silica solutions that transform to gels are provided on time scales varying from a few seconds to many days. The present invention provides a desired gelation time, with reservoir modeling to predict transport times. By combining the two the process is tuned.

Example 3

Figure 7:
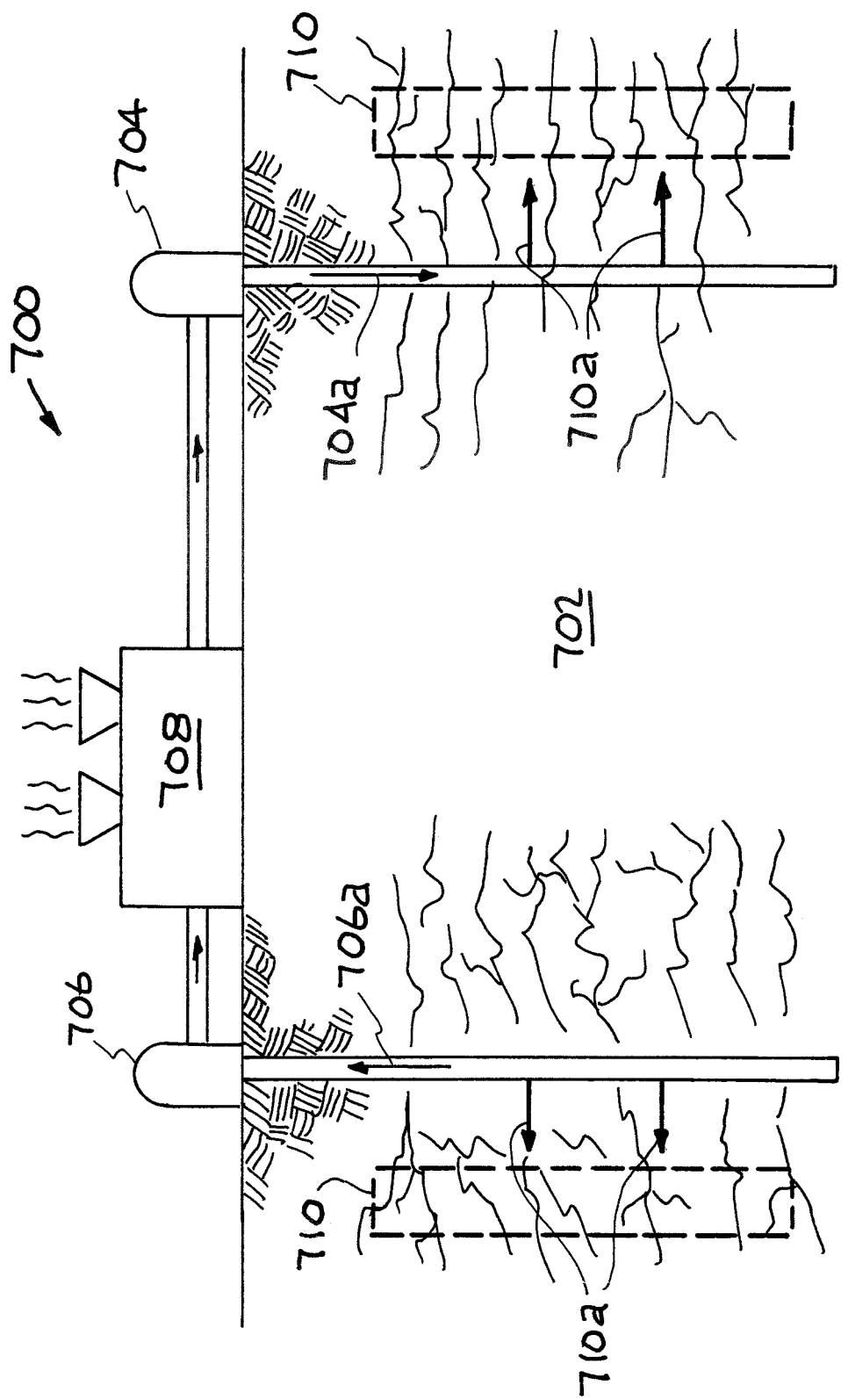
FIG. 7 is an illustration of a geothermal system incorporating another embodiment the present invention.

Referring now to FIG. 7, a geothermal system incorporating another embodiment of the present invention is illustrated. The geothermal system is designated generally by the reference numeral 700. The geothermal system 700 includes a first well 704 designated as an injection well and a second well 706 designated as extraction or production well. The first well 704 (injection well) and the second well 706 (extraction well) are shown extending into a geothermal formation 702.

Fluid is injected into the first well 704 (injection well) as illustrated by the arrow 704a and the fluid is extracted at the second well 706 (extraction well) a illustrated by the arrow 706a. The fluid from the second well flows into the power generation/cooling system 708. The geothermal formation 702 includes fractured geothermal formations made up of fractured rock 702a. The fluid from the injection well 704 is circulated through the fractured rock 702a where it is heated by the geothermal formation 702. This circulation pattern illustrates basic features of the production of energy from the geothermal formation 702. Enhanced Geothermal System (EGS) resources occur at depths of 3 to 5 miles everywhere beneath the Earth's surface and at lesser depths in certain areas. Access to these resources involves injecting water down the first well 704, circulating the water through the hot fractured rock 702a, and drawing off the heated water from the second well 706.

It is desirable to enhance production of geothermal energy from the formation 702 by reducing the flow of the fluid into formations other than the geothermal area between the first well 704 (injection well) and the second well 706 (extraction well). This is accomplished by creating reduced permeability sections 710 of the geothermal reservoir field are areas where injected fluids may travel and because they are not in the flow path between injection well and production well will be not be brought to the surface in the production well and will therefore not provide geothermal energy. The fluids are lost from the system and as a consequence make it necessary to add additional water to the injection well at some cost to the field operations.

As illustrated in FIG. 7, the reduced permeability sections 710 are located outside of the primary geothermal energy formation 702 between the first well 704 (injection well) and the second well 706 (extraction well). The present invention uses colloidal silica as a cementing agent to preferentially reduce permeability in these zones surrounding the target zone of energy production and prevent water loss into the surrounding zones. This is illustrated by the arrows 710a. A desired gelation time is selected with reservoir modeling and tracer test results such that gelation of the injected colloidal silica happens in the permeable zones surrounding the geothermal reservoir. The emplaced gel blocks the flow of injected fluid away from the geothermal reservoir and in so doing increases the amount of energy that is available for production and lowers the amount of water lost from the system. The gels may be emplaced using the existing injection and production wells, other wells if they exist, or new wells if affordable The rate at which colloidal silica solutions transform to gel is affected by the size and concentration of silica colloids, the pH, and salt content of the fluids, and the temperature. By adjusting one of more of these parameters, the colloidal silica solutions transform to gels on time scales of a few seconds to many days. The present invention provides a desired gelation time with reservoir modeling providing the target gelation time for emplacement at the desired location. By combining the two, the process is tuned.

Example 4

Figure 8:
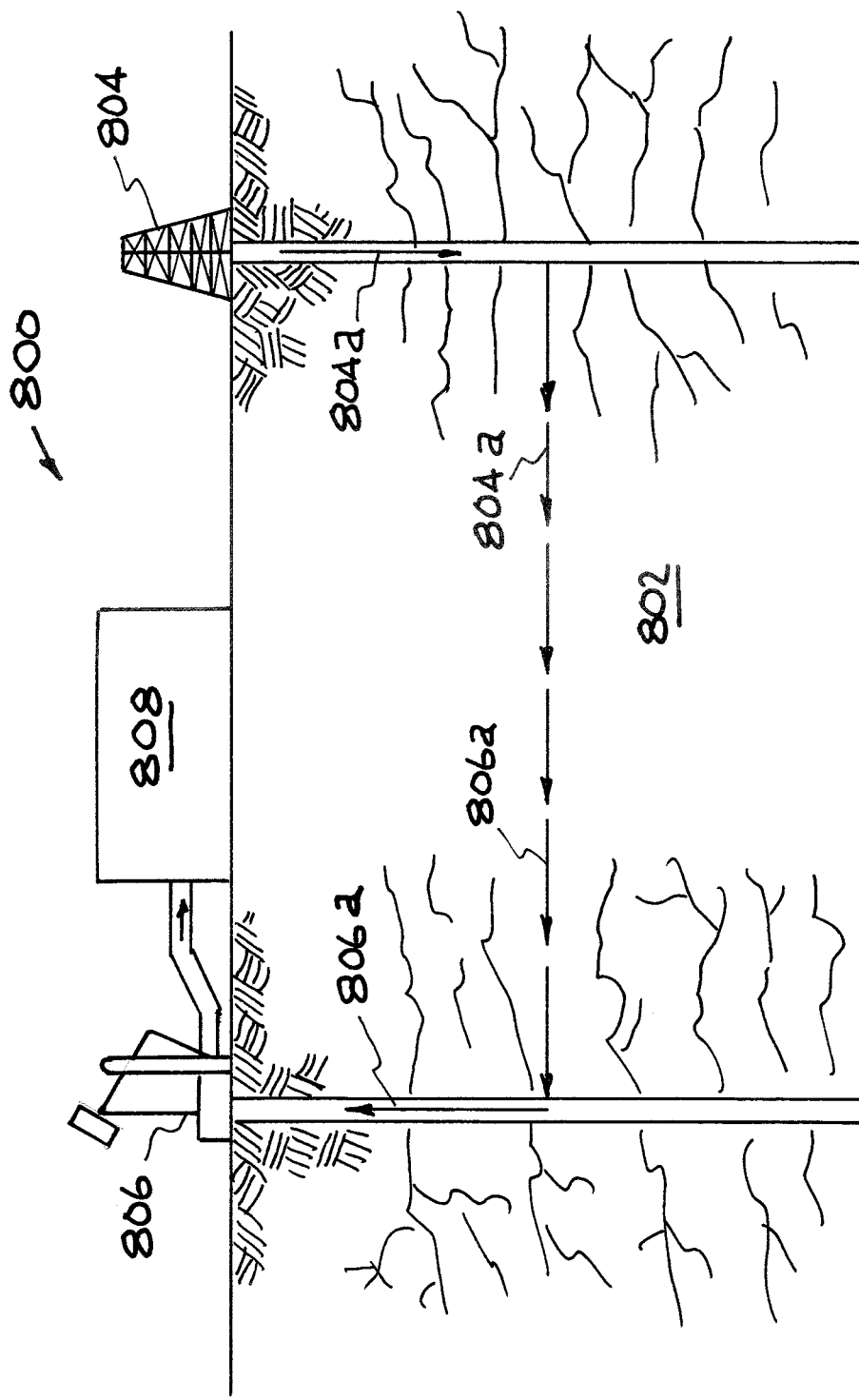
FIG. 8 illustrates a system with an oil reservoir having an injection and a production well where enhanced oil recovery is taking place.
Figure 9:
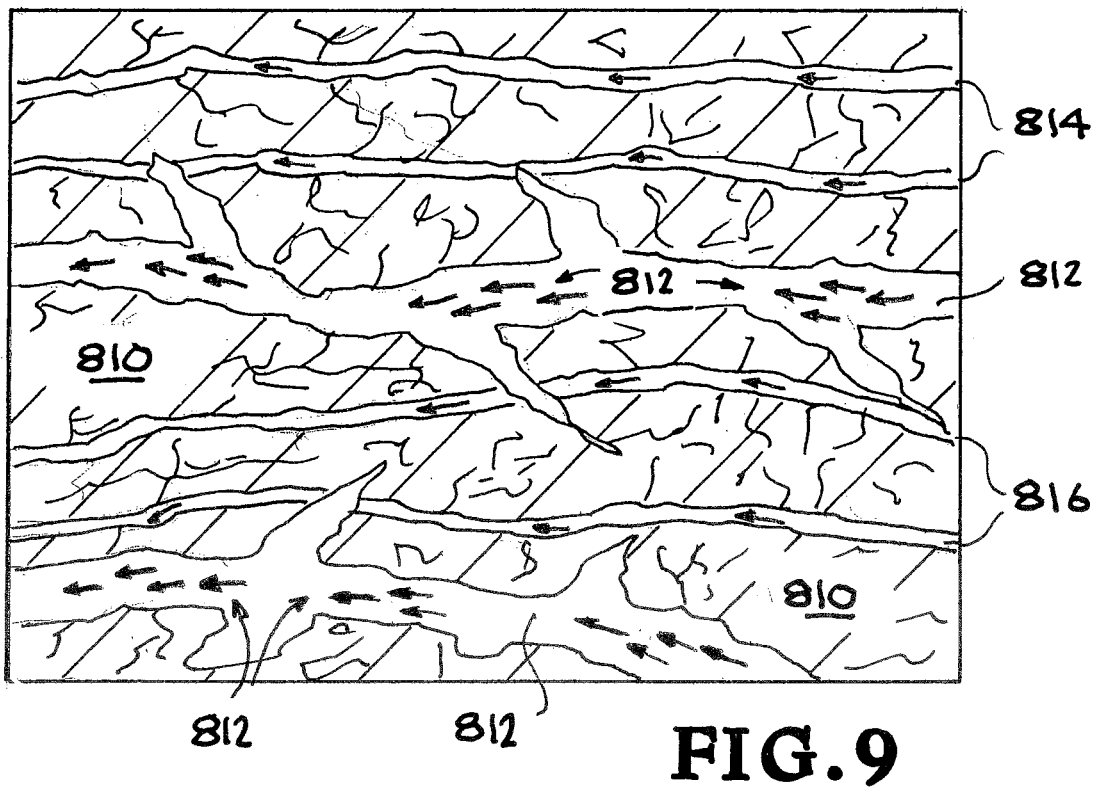
FIG. 9 shows sections of the petroleum reservoir including areas where injected fluids may travel.
Figure 10:
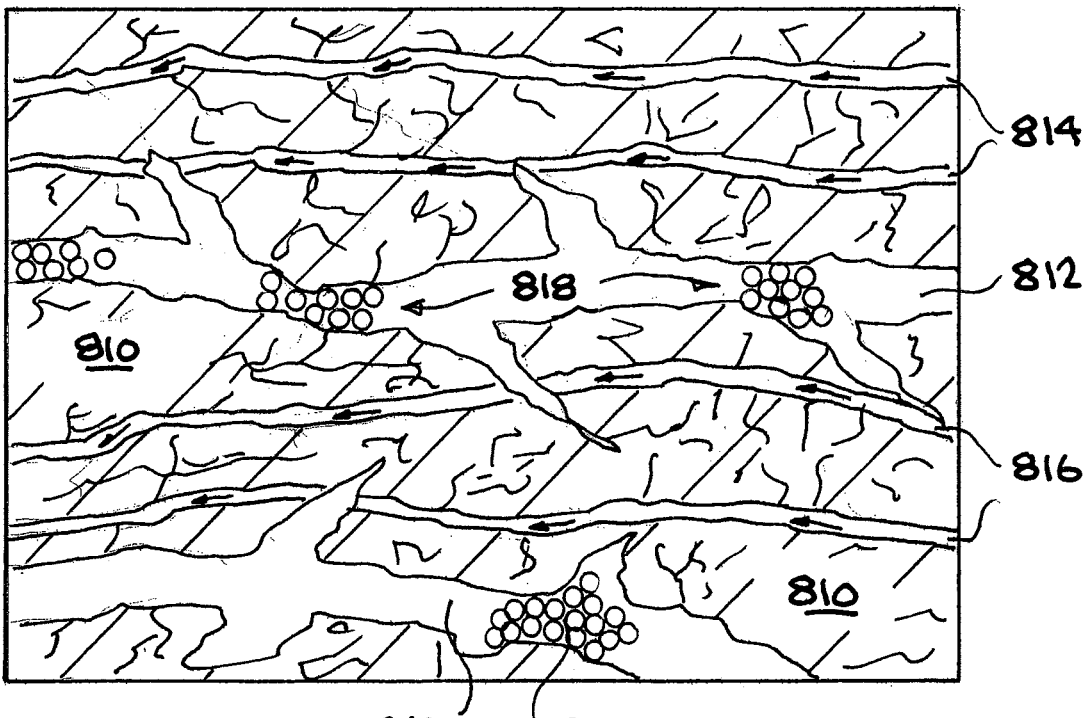
FIG. 10 shows sections of the petroleum reservoir including areas where injected fluids may travel where enhanced oil recovery is taking place.

Referring now to FIGS. 8, 9, and 10; a system incorporating another embodiment of the present invention is illustrated. This embodiment of the present invention is a system with an oil reservoir 802 having an injection 804 and a production well 806 where enhanced oil recovery is taking place. The system is designated generally by the reference numeral 800. The system 800 includes a first well 804 designated as an injection well and a second well 806 designated as extraction or production well. The first well 804 (injection well) and the second well 806 (extraction well) are shown extending into the oil reservoir 802. Fluids are injected at 804 as illustrated by the arrows 804a and oil extracted at 806 as illustrated by the arrows 806a. The extracted oil is directed into tank 808. The injected fluid displaces the existing subsurface fluid which contains some fraction of petroleum which is brought to the surface in the production well.

Referring to FIG. 10, the present invention uses colloidal silica as a cementing agent to preferentially reduce permeability in zone 812 such that injected fluid is forced to travel through zones 814 and 816 and in so doing cause displacement of the liquid petroleum through the reservoir to the production well 806 of FIG. 8, where it is brought to the surface. FIG. 10 illustrates that deposits 818 of liquid petroleum have been moved into flow channel 812. The colloidal silica solution is injected with known chemical properties such that it will transform to a gel after a given amount of time when it is predicted to be present in the fast path zone 812. Such predictions may be made using reservoir modeling and using the results of tracer tests.

Referring to FIG. 10, the present invention uses colloidal silica as a cementing agent to preferentially reduce permeability in zone 812 such that injected fluid is forced to travel through zones 814 and 816 and in so doing cause displacement of the liquid petroleum through the reservoir to the production well 806 of FIG. 8, where it is brought to the surface. FIG. 10 illustrates that deposits 818 of liquid petroleum have been moved into flow channel 812. The colloidal silica solution is injected with known chemical properties such that it will transform to a gel after a given amount of time when it is predicted to be present in the fast path zone 812. Such predictions may be made using reservoir modeling and using the results of tracer tests.

The rate at which colloidal silica solutions transform to gel is affected by the size and concentration of silica colloids, the pH, and salt content of the fluids, and the temperature. By adjusting one of more of these parameters, the colloidal silica solutions transform to gels on time scales of a few seconds to many days. The present invention provides a desired gelation time with reservoir modeling providing the target gelation time for emplacement at the desired location. By combining the two, the process is tuned.

Example 5

Figure 11:
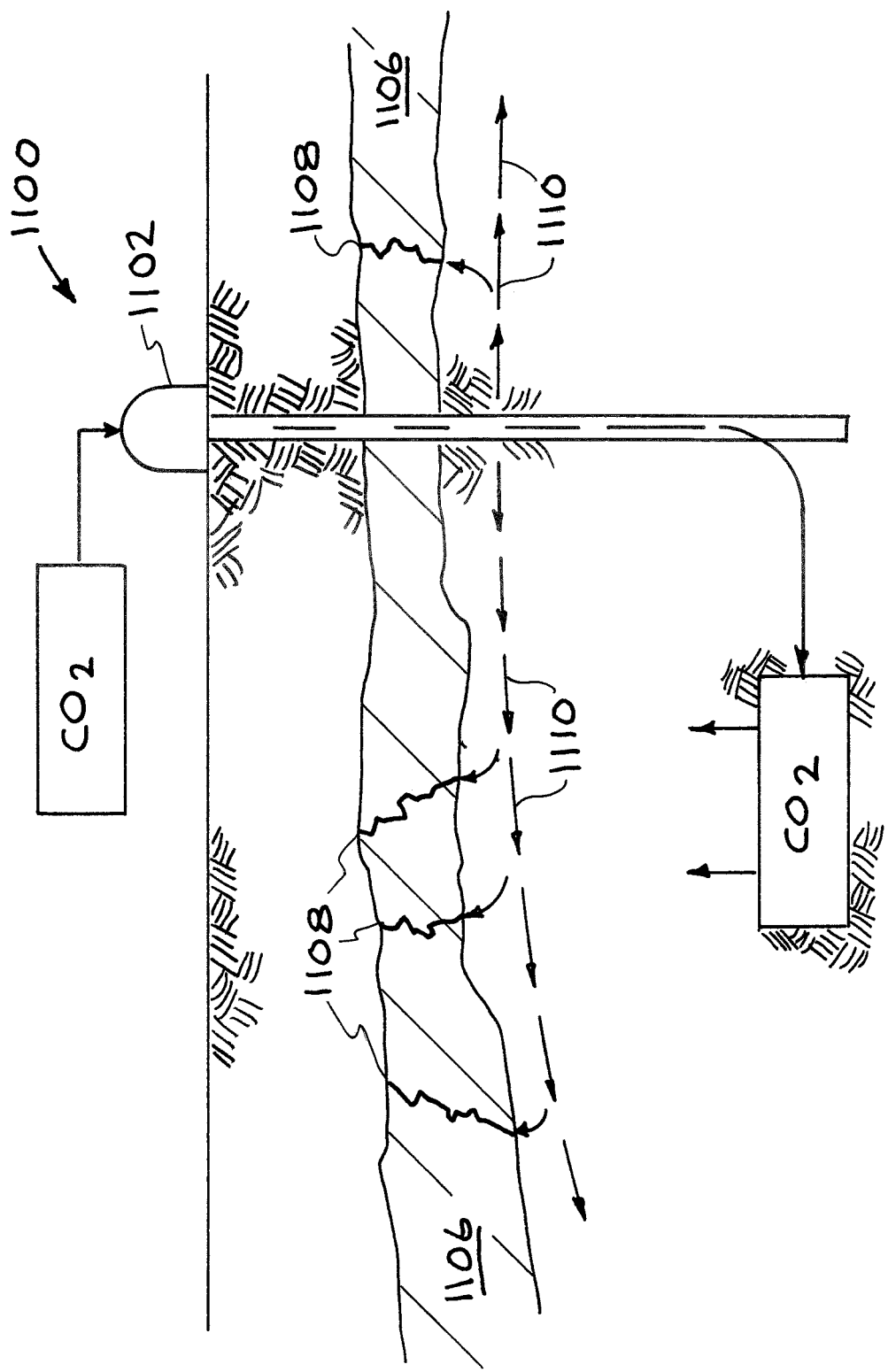
FIG. 11 illustrates another example of a system of the present invention in connection with subsurface reservoir used for storage of carbon dioxide.

Another example of a system of the present invention is illustrated and described in FIG. 11 which shows a subsurface reservoir used for storage of carbon dioxide. The system is designated generally by the reference numeral 1100. As illustrated in FIG. 11, $CO_2$ is injected into the subsurface in an injection well 1102 where it fills pore space within the rock. Because the $CO_2$ phase is less dense than aqueous brines that co-exist in the subsurface, it will, over time, tend to rise vertically. The reservoir contains a layer 1106 ("cap rock") that is impermeable to $CO_2$ migration and thus provides a barrier to upward migration of $CO_2$. Although formations are chosen such that they have cap rocks that are believed to be entirely impermeable to $CO_2$ escape, they may in fact have fractures or other permeable pathways that would allow $CO_2$ passage.

Referring to FIG. 11, the present invention uses colloidal silica 1110 as a cementing agent to preferentially fill permeable pathways 1108 in the cap rock 1106 and prevent $CO_2$ leakage. The colloidal silica solutions are injected into the subsurface using the existing injection wells for $CO_2$ emplacement, or injected using wells drilled for the purpose of gel emplacement. The colloidal silica solutions are prepared such that they have densities lower than the brines contained in the rocks beneath the cap rock. This is done by varying the silica content of the fluids. In this way, the gel solutions will migrate upwards into the cap rock where they will gel in the fracture zones and prevent $CO_2$ leakage.

The colloidal silica solution is injected with known chemical properties such that it will transform to a gel after a given amount of time, when it is predicted to be present in the fracture zones of the cap rock. Such predictions may be made using reservoir modeling and using the results of tracer tests.

The rate at which colloidal silica solutions transform to gel is affected by the size and concentration of silica colloids, the pH, and salt content of the fluids, and the temperature. By adjusting one of more of these parameters, the colloidal silica solutions transform to gels on time scales of a few seconds to many days. The present invention provides a desired gelation time with reservoir modeling providing the target gelation time for emplacement at the desired location. By combining the two, the process is tuned.

Example 6

Figure 12:
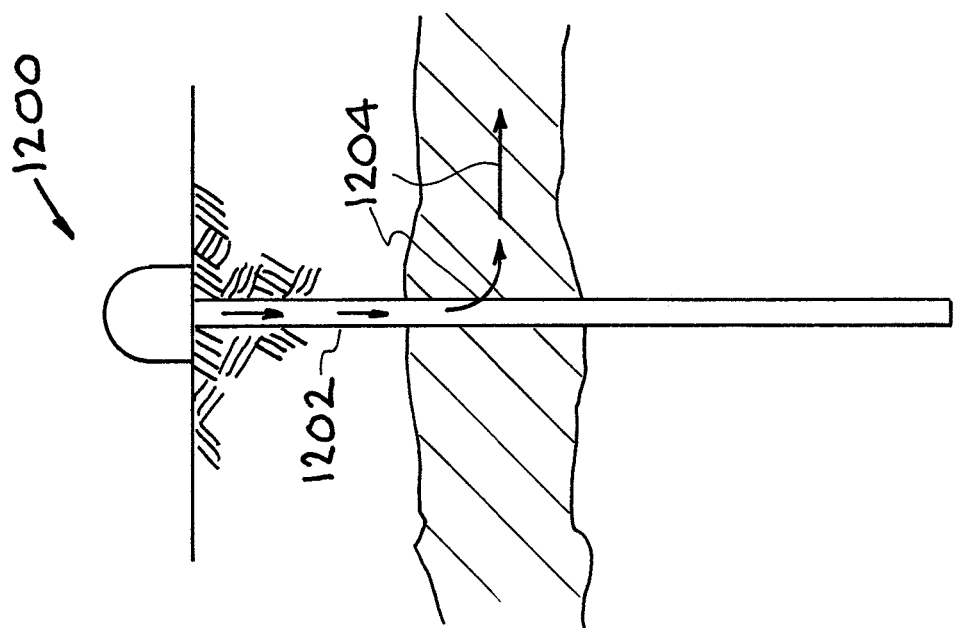
FIG. 12 illustrates another example of a system of the present invention to prevent leakage into or out of well.

The Another example of a system of the present invention is illustrated and described in FIG. 12 which shows a well used for injection or production of subsurface fluids. The system is designated generally by the reference numeral 1200. The subsurface fluids may contain brine, non-aqueous fluids, pressurized carbon dioxide, or other types of fluids. Although measures are taken to prevent leakage into or out of well, such as metal casings used to line the wells and cements and grouts used to fill any open space surrounding the well, wells commonly leak and in so doing may cause unwanted contamination of surrounding fluids such as water aquifers used as public water supplies. As illustrated in FIG. 12, well casing 1202 may corrode and cause leakage, cements may crack and allow fluid migration as illustrated by the arrow 1204. In addition, commonly used cements and grouts are more viscous than water and often do not impregnate the subsurface and block passages that are accessible to water, having a much lower viscosity.

Figure 13:
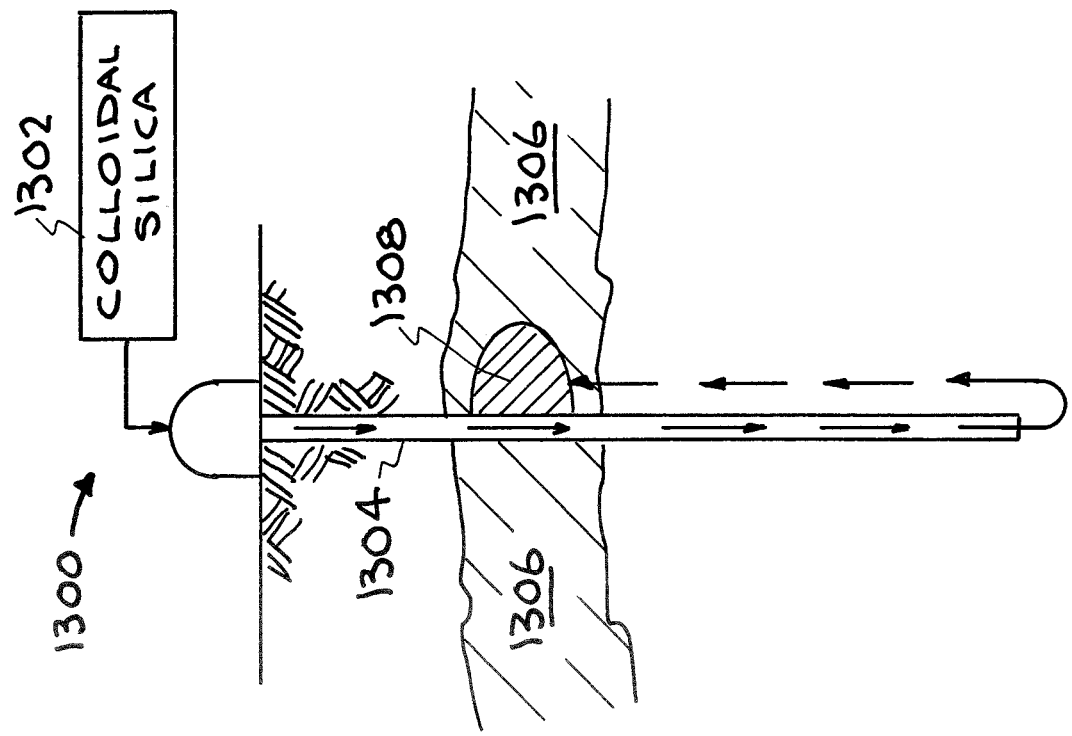
FIG. 13 illustrates another example of a system of the present invention to prevent leakage into or out of well.

Referring to FIG. 13, the present invention designated generally by the reference numeral 1300 uses colloidal silica 1302 as a cementing agent to preferentially fill all permeable pathways surrounding the well bore 1304. The gel may be emplaced in the formation 1306 by pumping it down through the well to the bottom of the well where it then rises along the outside of the well casing and fills all accessible pore space 1308. The colloidal silica solutions are prepared such that they have gelation times that allow the low viscosity fluid phase adequate time to reach all targeted zones surrounding the well bore. The solutions then transform to a solid material that will help to prevent leakage into or out of the well bore and thus prevent unwanted fluids from contaminating aquifers or other subsurface features that would be negatively impacted by fluid leakage from the well. Colloidal silica has an advantage over other commonly used cementing materials of having a very low (water-like) viscosity such that it will penetrate more deeply into existing fractures and pore spaces and block subsequent flow. Colloidal silica is also unreactive in the subsurface and will not contaminate or react with existing materials in unwanted or damaging ways. For example it will not over time decompose to give off toxic compounds such as might be the case for polymeric cementing agents. Silica gel ages to form amorphous silica, a type of agate which is naturally abundant in the subsurface. Conventional cements such as Portland Cements have very high pH and may react in unwanted ways with existing fluids and rocks in the subsurface.

The rate at which colloidal silica solutions transform to gel is affected by the size and concentration of silica colloids, the pH, and salt content of the fluids, and the temperature. By adjusting one of more of these parameters, the colloidal silica solutions transform to gels on time scales of a few seconds to many days. The present invention provides a desired gelation time with reservoir modeling providing the target gelation time for emplacement at the desired location. By combining the two the process is tuned.

Example 7

Figure 14:
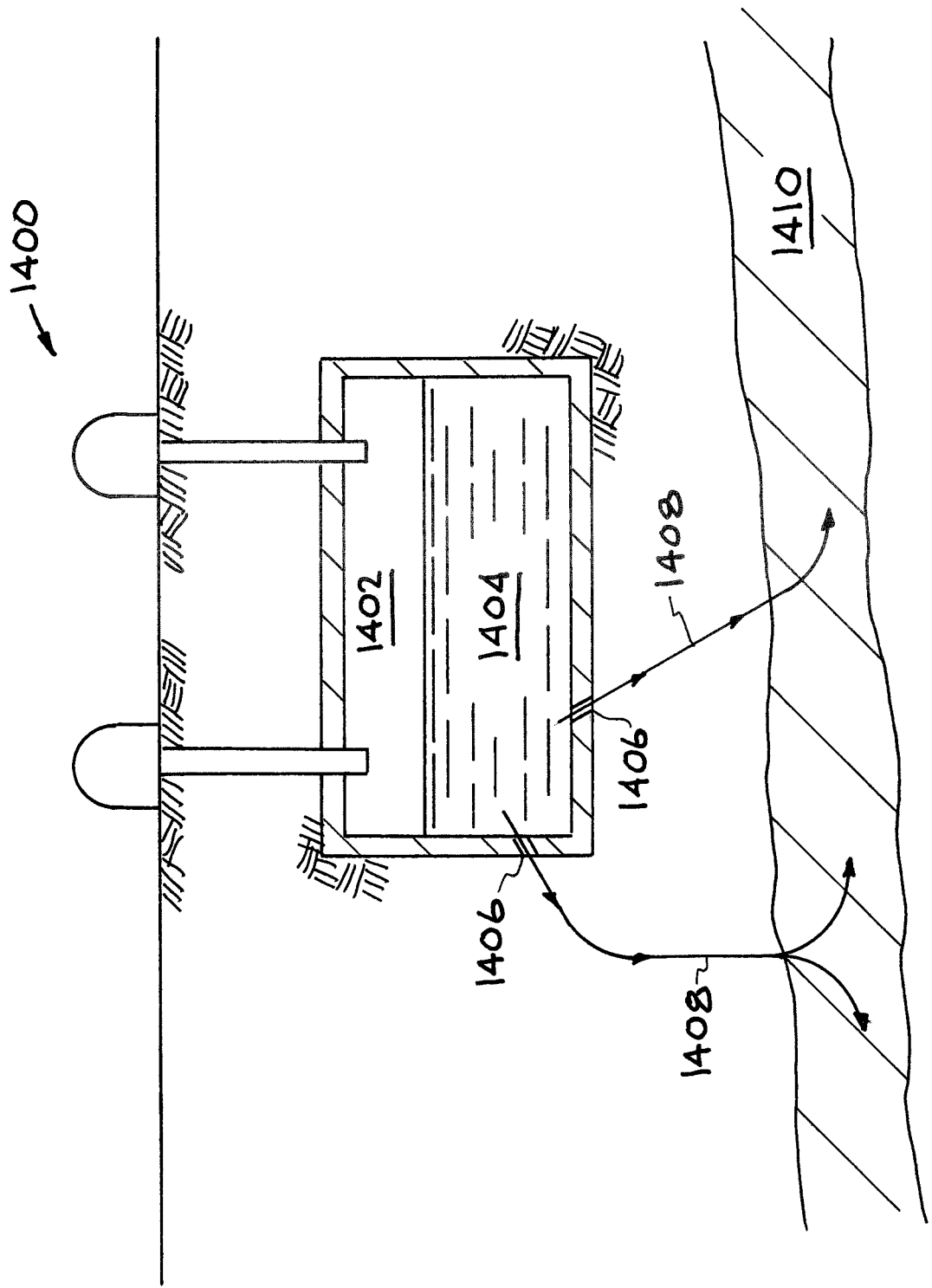
FIG. 14 illustrates another example of a system of the present invention in connection with leakage from an underground storage tank.
Figure 15:
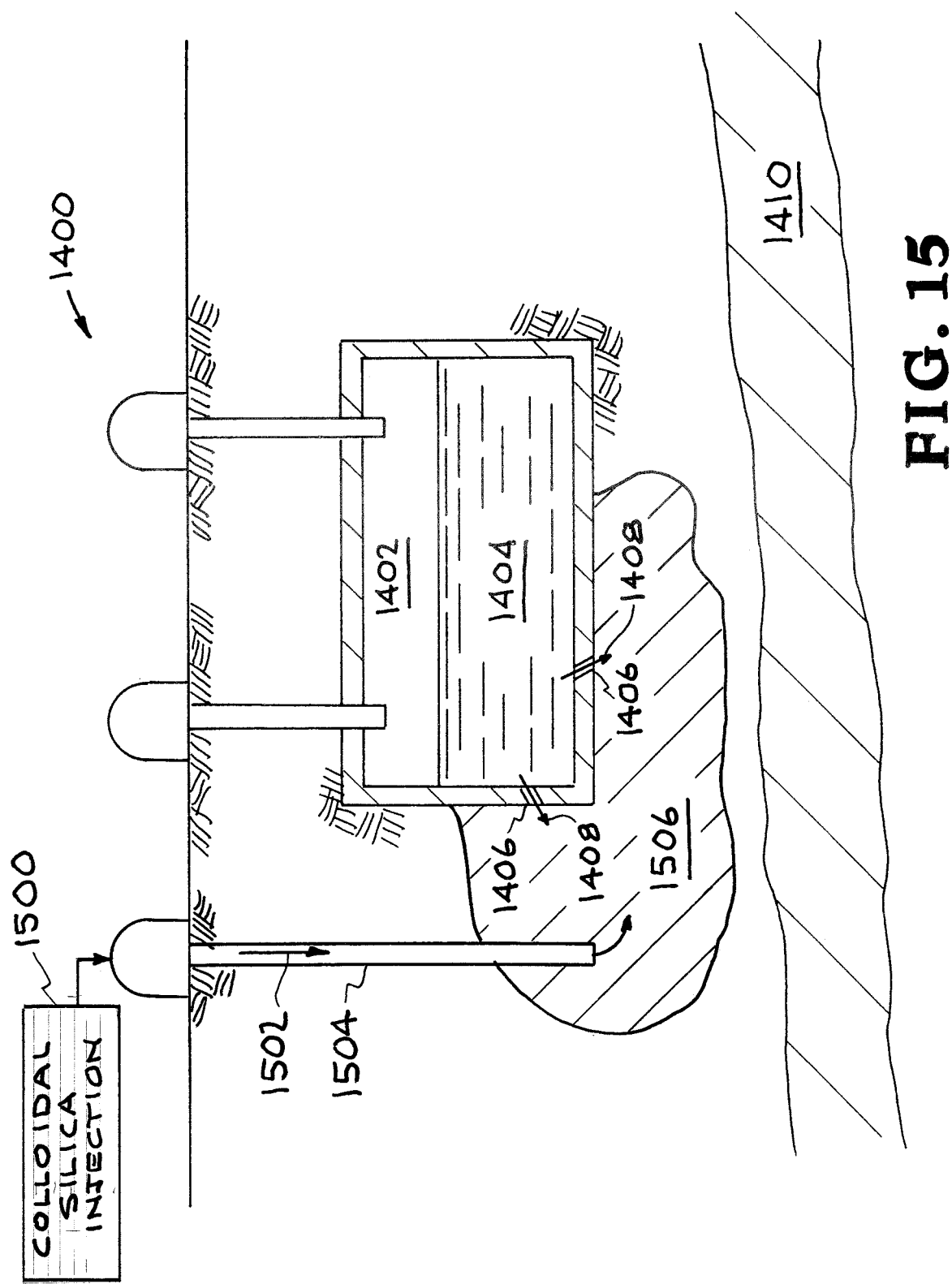
FIG. 15 illustrates another example of a system of the present invention in connection with leakage from an underground storage tank.

Another example of a system of the present invention is illustrated and described in FIGS. 14 and 15. This example is designated generally by the reference numeral 1400. Referring to FIG. 14, an underground waste storage tank 1402 which contains hazardous liquid waste 1404 is illustrated. The tank 1402 has corroded and is now leaking through leak 1406 as illustrated by the arrows 1408. The hazardous materials 1404 are shown migrating into the subsurface formation 1410 where they migrate away from the storage site and may cause contamination of local water supplies or in other ways have a negative impact on the local environment.

Referring to FIG. 15, the present invention 1400 uses colloidal silica 1500 as a cementing agent to preferentially block leakage 1406 of contaminants 1404 from the tank 1402. This is accomplished by pumping 1502 the material 1500 through a well 1504 drilled so as to access the subsurface in the vicinity of the leakage zones 1408. Colloidal silica 1500 is pumped into the subsurface in the leakage zones 1408 and tuned such that after it reaches that zone in a low viscosity liquid state will transform into an impermeable gel 1506 that blocks leakage from the tank.

The rate at which colloidal silica solutions transform to gel is affected by the size and concentration of silica colloids, the pH, and salt content of the fluids, and the temperature. By adjusting one of more of these parameters, the colloidal silica solutions transform to gels on time scales of a few seconds to many days. The present invention provides a desired gelation time with reservoir modeling providing the target gelation time for emplacement at the desired location. By combining the two the process is tuned.

Example 8

Figure 16:
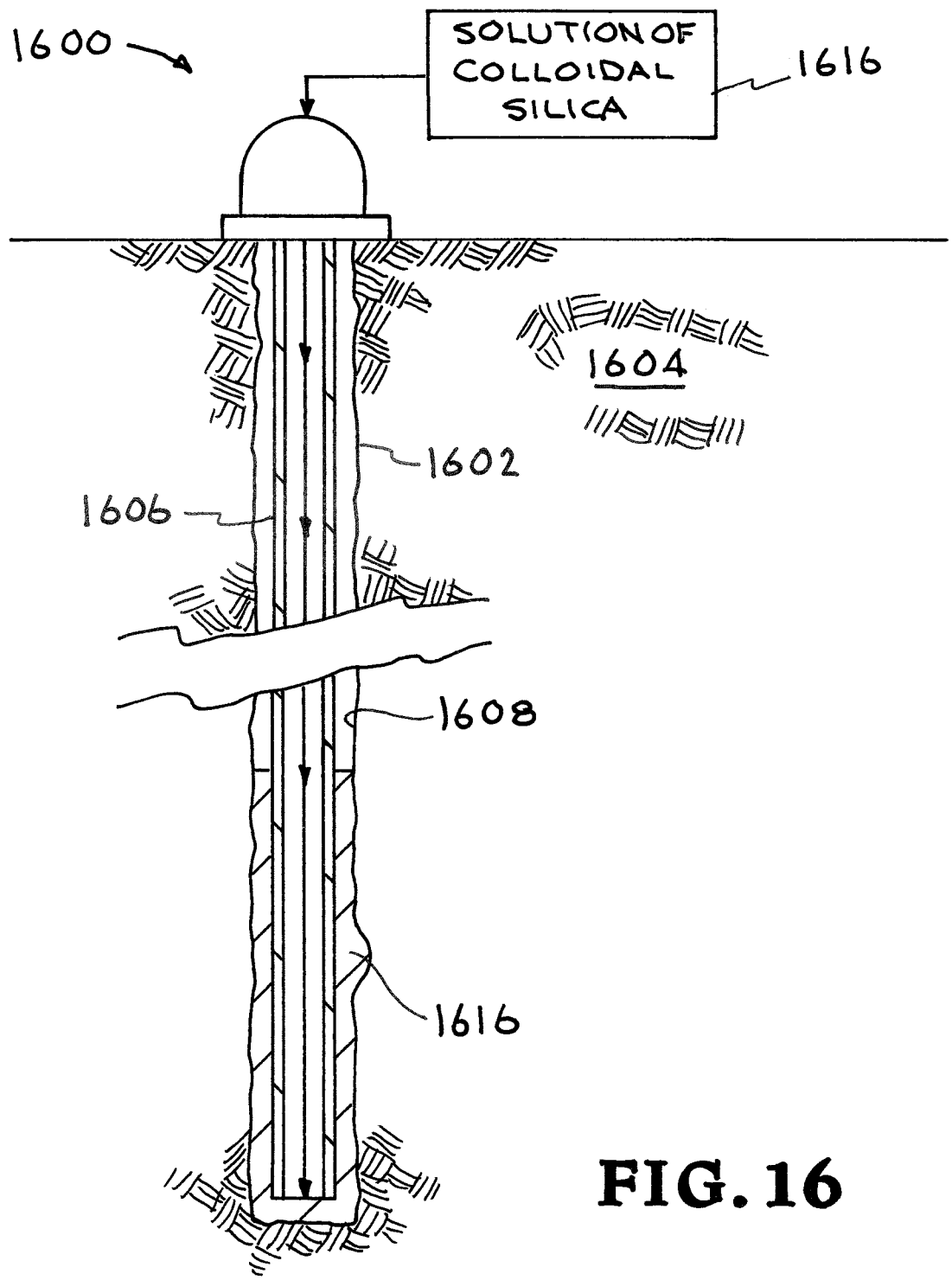
FIG. 16 illustrates an example of a system of the present invention in connection with cementing a pipe in a borehole in a formation.

Another example of a system of the present invention is illustrated and described in FIG. 16 which shows a system of cementing a pipe in a borehole in a formation. The system is designated generally by the reference numeral 1600. The system 1600 provides application of a liquid slurry of colloidal silica to various points inside or outside a pipe 1606 in a borehole 1602 in a formation 1604.

The system 1600 includes preparing a solution of colloidal silica 1616 having a nonviscous phase and a solid gel phase and injecting the solution of colloidal silica 1616 into the borehole 1602 while said solution of colloidal silica is in said nonviscous phase. The solution of colloidal silica 1616 flows through pipe 1606 into the borehole 1602 and up the annulus between the pipe 1606 and the wall 1608 of the borehole 1602. The colloidal silica 1616 is allowed to harden cementing the pipe 1606 in the borehole 1602 in the formation 1604.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A method of improving efficiency of production from a primary geothermal formation, comprising the steps of:
   providing an injected fluid;
   providing an injection well in an operative position to the primary geothermal formation;
   providing an extraction well in an operative position to the primary geothermal formation, wherein said injection well and said extraction well are located to provide a flow path for said injected fluid from said injection well through said primary geothermal formation to said extraction well;
   preparing a solution of colloidal silica having a nonviscous phase and a solid gel phase with a gelation time between said nonviscous phase and said solid gel phase;
   injecting said solution of colloidal silica through said injection well in said nonviscous phase to create an injection well reduced permeability section zone outside of the primary geothermal formation proximate said injection well, wherein said injection well is located between said injection well reduced permeability section zone and the primary geothermal formation;
   selecting said gelation time by reservoir modeling and tracer test results such that said gelation time of said colloidal silica happens in said injection well reduced permeability section zone; and
   using said gelation time for allowing said colloidal silica to enter said solid gel phase and create said injection well reduced permeability section zone and improve efficiency of production from the primary geothermal formation.

2. The method of improving efficiency of production from a primary geothermal formation of claim 1,
   further comprising the steps of:
   creating an extraction well reduced permeability section zone located outside of the primary geothermal formation proximate said extraction well by injecting a solution of colloidal silica through said injection well.

3. The method of improving efficiency of production from a primary geothermal formation of claim 1 wherein said gelation time is predetermined by adjusting the silica content of said colloidal silica.

4. The method of improving efficiency of production from a primary geothermal formation of claim 1 wherein said gelation time is predetermined by adjusting the colloid size of said colloidal silica.

5. The method of improving efficiency of production from a primary geothermal formation of claim 1 wherein said gelation time is predetermined by adjusting the salinity of said colloidal silica.

6. The method of improving efficiency of production from a primary geothermal formation of claim 1 wherein said gelation time is predetermined by adjusting the pH of said colloidal silica.

* * * * *